(12) United States Patent
Chen et al.

(10) Patent No.: US 9,153,383 B2
(45) Date of Patent: Oct. 6, 2015

(54) WINDING-TYPE SOLID ELECTROLYTIC CAPACITOR PACKAGE STRUCTURE WITHOUT USING A LEAD FRAME

(71) Applicant: APAQ TECHNOLOGY CO., LTD., Miaoli County (TW)

(72) Inventors: Ming-Tsung Chen, Changhua County (TW); Ching-Feng Lin, Hsinchu County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 192 days.

(21) Appl. No.: 13/845,183

(22) Filed: Mar. 18, 2013

(65) Prior Publication Data

US 2014/0268503 A1    Sep. 18, 2014

(51) Int. Cl.
*H01G 9/008* (2006.01)
*H01G 4/228* (2006.01)
*H01G 9/00* (2006.01)
*H01G 9/012* (2006.01)
*H01G 4/32* (2006.01)

(52) U.S. Cl.
CPC .............. *H01G 9/0029* (2013.01); *H01G 4/228* (2013.01); *H01G 4/32* (2013.01); *H01G 9/008* (2013.01); *H01G 9/012* (2013.01); *H01G 9/016* (2013.01); *Y10T 29/302* (2015.01); *Y10T 29/417* (2015.01)

(58) Field of Classification Search
CPC .......... H01G 9/15; H01G 9/151; H01G 9/008; H01G 9/10; H01G 9/0029; H01G 11/04; H01G 11/06; H01G 11/30; H01G 11/42; H01G 11/74; H01G 11/82; H01G 2/103
See application file for complete search history.

(56) References Cited

U.S. PATENT DOCUMENTS

| | | | | |
|---|---|---|---|---|
| 3,457,478 A | * | 7/1969 | Lehrer | 361/304 |
| 4,166,285 A | * | 8/1979 | Bauer et al. | 361/307 |
| 4,876,451 A | * | 10/1989 | Ikeda et al. | 361/540 |
| 2006/0115723 A1 | * | 6/2006 | Ando et al. | 429/162 |

* cited by examiner

*Primary Examiner* — Dion R Ferguson
(74) *Attorney, Agent, or Firm* — Rosenberg, Klein & Lee

(57) ABSTRACT

A winding-type solid electrolytic capacitor package structure without using any lead frame includes a winding capacitor and a package body. The winding capacitor has a winding body enclosed by the package body, a positive conductive lead pin extended from a first lateral side of the winding body, and a negative conductive lead pin extended from a second lateral side of the winding body. The positive conductive lead pin has a first embedded portion enclosed by the package body and a first exposed portion exposed outside the package body and extended along the first lateral surface and the bottom surface of the package body. The negative conductive lead pin has a second embedded portion enclosed by the package body and a second exposed portion exposed outside the package body and extended along the second lateral surface and the bottom surface of the package body.

12 Claims, 12 Drawing Sheets

1012

102 providing at least one winding capacitor, wherein the winding capacitor has a winding body, a positive conductive lead pin extended from a first lateral side of the winding body, and a negative conductive lead pin extended from a second lateral side of the winding body ~S100 forming a package body to enclose the winding body, wherein the positive conductive lead pin has a first embedded portion enclosed by the package body and a first exposed portion exposed outside the package body, and the negative conductive lead pin has a second embedded portion enclosed by the package body and a second exposed portion exposed outside the package body ~S102 flattening the top side and the bottom side of the first exposed portion and the top side and the bottom side of the second exposed portion ~S104 bent the first exposed portion and the second exposed portion along an outer surface of the package body ~S106

WINDING-TYPE SOLID ELECTROLYTIC CAPACITOR PACKAGE STRUCTURE WITHOUT USING A LEAD FRAME

BACKGROUND OF THE INVENTION

1. Field of the Invention

The instant disclosure relates to a solid electrolytic capacitor package structure and a method of manufacturing the same, and more particularly to a winding-type solid electrolytic capacitor package structure without using a lead frame and a method of manufacturing the same.

2. Description of Related Art

The winding-type capacitor includes a capacitor core, a casing, and a sealing cover. The capacitor core has an anode foil coupled to an anode terminal, a cathode foil coupled to a cathode terminal, a separator, and an electrolyte layer. The anode foil, the cathode foil and the separator are rolled together. The separator is disposed between the anode foil and the cathode foil. The electrolyte layer is formed between the anode foil and the cathode foil. The casing has an opening for receiving the capacitor core. The sealing cover can used to seal the casing, and the anode terminal and the cathode terminal can pass through a through hole of the sealing cover. A given space is provided between the sealing cover and the capacitor core. A stopper is provided for securing the space is provided on at least one of the anode terminal and the cathode terminal. However, there is no any other package body for enclosing the winding-type capacitor in the prior art.

SUMMARY OF THE INVENTION

One aspect of the instant disclosure relates to a winding-type solid electrolytic capacitor package structure without using a lead frame and a method of manufacturing the same.

One of the embodiments of the instant disclosure provides a winding-type solid electrolytic capacitor package structure without using a lead frame, comprising: a capacitor unit and a package unit. The capacitor unit includes at least one winding capacitor, wherein the at least one winding capacitor has a winding body, a positive conductive lead pin extended from a first lateral side of the winding body, and a negative conductive lead pin extended from a second lateral side of the winding body. The package unit includes a package body for enclosing the winding body, wherein the package body has a first lateral surface, a second lateral surface opposite to the first lateral surface, and a bottom surface connected between the first lateral surface and the second lateral surface. In addition, the positive conductive lead pin has a first embedded portion enclosed by the package body and a first exposed portion connected with the first embedded portion and exposed outside the package body, and the first exposed portion is extended along the first lateral surface and the bottom surface of the package body. The negative conductive lead pin has a second embedded portion enclosed by the package body and a second exposed portion connected with the second embedded portion and exposed outside the package body, and the second exposed portion is extended along the second lateral surface and the bottom surface of the package body.

Another one of the embodiments of the instant disclosure provides a method of manufacturing a winding-type solid electrolytic capacitor package structure without using a lead frame, comprising: providing at least one winding capacitor, wherein the at least one winding capacitor has a winding body, a positive conductive lead pin extended from a first lateral side of the winding body, and a negative conductive lead pin extended from a second lateral side of the winding body; forming a package body to enclose the winding body, wherein the positive conductive lead pin has a first embedded portion enclosed by the package body and a first exposed portion connected with the first embedded portion and exposed outside the package body, and the negative conductive lead pin has a second embedded portion enclosed by the package body and a second exposed portion connected with the second embedded portion and exposed outside the package body; and then bent the first exposed portion and the second exposed portion along an outer surface of the package body.

More precisely, the positive conductive lead pin has a first positive conductive portion electrically contacting the positive foil sheet, a second positive conductive portion, and a first soldering portion connected between the first positive conductive portion and the second positive conductive portion, the first positive conductive portion is made of a pure Al material or an Al alloy material, the second positive conductive portion is a first multilayer structure composed of a plurality of first material layers, and the negative conductive lead pin is a second multilayer structure composed of a plurality of second material layers, wherein the innermost first material layer is a Fe layer or a Cu layer, the outermost first material layer is an Sn layer surrounding the Fe layer or the Cu layer, the innermost second material layer is a pure Al layer or an Al alloy layer, and the outermost second material layer is an Sn layer surrounding the pure Al layer or the Al alloy layer.

More precisely, the positive conductive lead pin is a first multilayer structure composed of a plurality of first material layers, the negative conductive lead pin is a second multilayer structure composed of a plurality of second material layers, both the innermost first material layer and the innermost second material layer are two pure Al layers or Al alloy layers, and both the outermost first material layer and the outermost second material layer are two Sn layers respectively surrounding the two pure Al layers or the two Al alloy layers.

More precisely, the positive conductive lead pin has a first positive conductive portion electrically contacting the positive foil sheet, a second positive conductive portion, and a first soldering portion connected between the first positive conductive portion and the second positive conductive portion, the negative conductive lead pin has a first negative conductive portion electrically contacting the negative foil sheet, a second negative conductive portion, and a second soldering portion connected between the first negative conductive portion and the second negative conductive portion, both the first positive conductive portion and the first negative conductive portion are made of a pure Al material or an Al alloy material, the second positive conductive portion is a first multilayer structure composed of a plurality of first material layers, and the second negative conductive portion is a second multilayer structure composed of a plurality of second material layers, wherein both the innermost first material layer and the innermost second material layer are two Fe layers or two Cu layers, and both the outermost first material layer and the outermost second material layer are two Sn layers respectively surrounding the two Fe layers or the two Cu layers.

More precisely, the at least one winding capacitor is processed by a carbonization process, a formation process and a polymer-impregnated process in sequence in the step of providing the at least one winding capacitor, and the at least one winding capacitor is processed by an ageing process after the step of forming the package body to enclose the winding body.

More precisely, the method further comprises: flattening the top side and the bottom side of the first exposed portion and the top side and the bottom side of the second exposed portion, wherein the first exposed portion has a first flattening surface and a second flattening surface respectively formed on the top side and the bottom side thereof, and the second exposed portion has a first flattening surface and a second flattening surface respectively formed on the top side and the bottom side thereof.

More precisely, the package body has a first lateral surface, a second lateral surface opposite to the first lateral surface, and a bottom surface connected between the first lateral surface and the second lateral surface, the first exposed portion is extended along the first lateral surface and the bottom surface of the package body, and the second exposed portion is extended along the second lateral surface and the bottom surface of the package body, wherein the second flattening surface of the first exposed portion is directed toward the first lateral surface and the bottom surface of the package body, and the first flattening surface of the first exposed portion is opposite to the first lateral surface and the bottom surface of the package body, wherein the second flattening surface of the second exposed portion is directed toward the second lateral surface and the bottom surface of the package body, and the first flattening surface of the second exposed portion is opposite to the second lateral surface and the bottom surface of the package body.

Therefore, the at least one winding capacitor has a winding body, a positive conductive lead pin and a negative conductive lead pin, the positive conductive lead pin has a first embedded portion enclosed by the package body and a first exposed portion exposed outside the package body and extended along the outer surface of the package body, and the negative conductive lead pin has a second embedded portion enclosed by the package body and a second exposed portion exposed outside the package body and extended along the outer surface of the package body, thus the winding-type solid electrolytic capacitor package structure of the instant disclosure can be manufactured without using any lead frame for decreasing the manufacturing cost and increasing the manufacturing speed (i.e., the production quantity) and the production yield rate.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

FIG. 1 shows a flowchart of the method of manufacturing a winding-type solid electrolytic capacitor package structure without using a lead frame according to the first embodiment of the instant disclosure;

DETAILED DESCRIPTION OF THE PREFERRED EMBODIMENTS

First Embodiment

Figure 2:
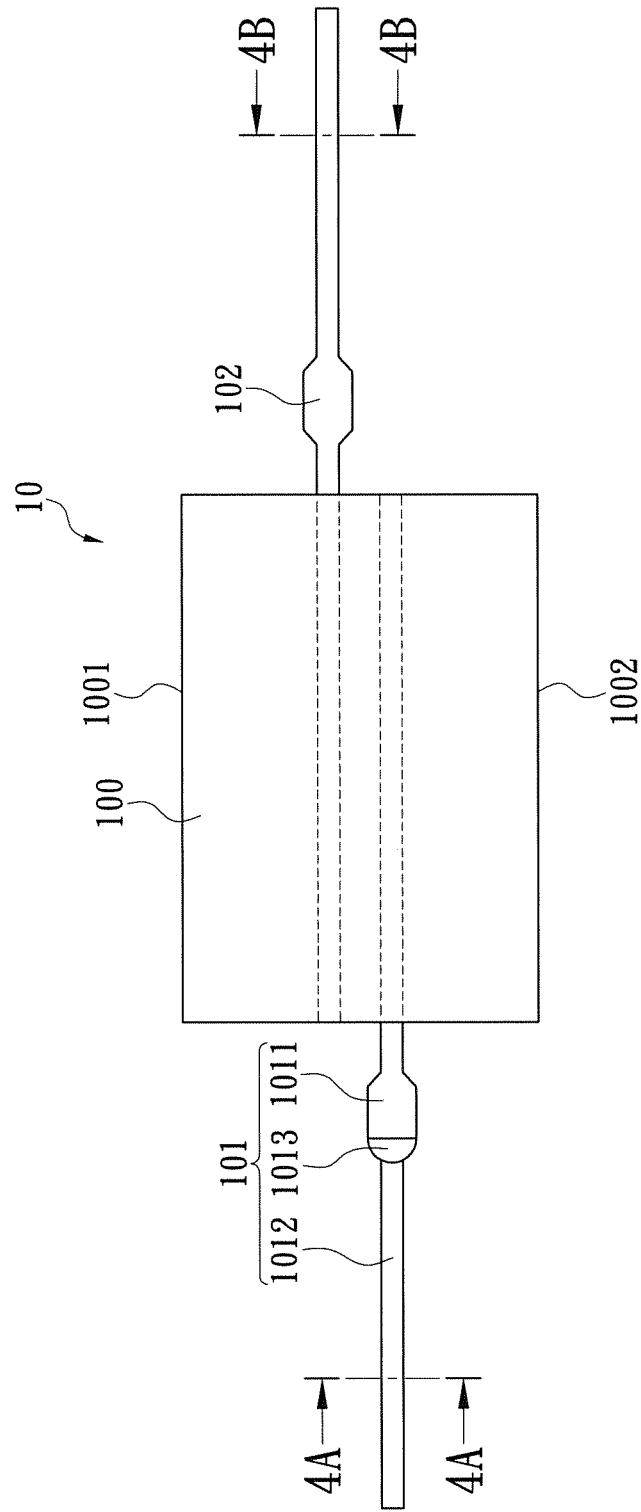
FIG. 2 shows a front, schematic view of both the first exposed portion of the positive conductive lead pin and the second exposed portion of the negative conductive lead pin having not been flattened yet according to the first embodiment of the instant disclosure.
Figure 3:
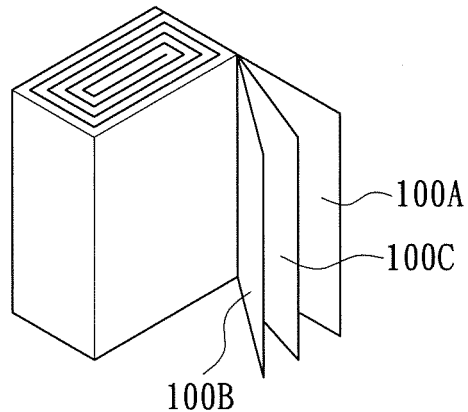
FIG. 3 shows a perspective, schematic view of the winding body according to the first embodiment of the instant disclosure.
Figure 4A:
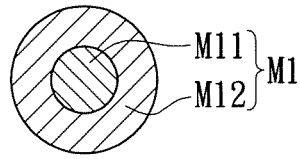
FIG. 4A shows a cross-sectional view taken along the section line 4A-4A of FIG. 2.
Figure 4B:
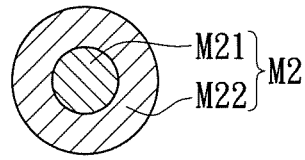
FIG. 4B shows a cross-sectional view taken along the section line 4B-4B of FIG. 2.
Figure 5:
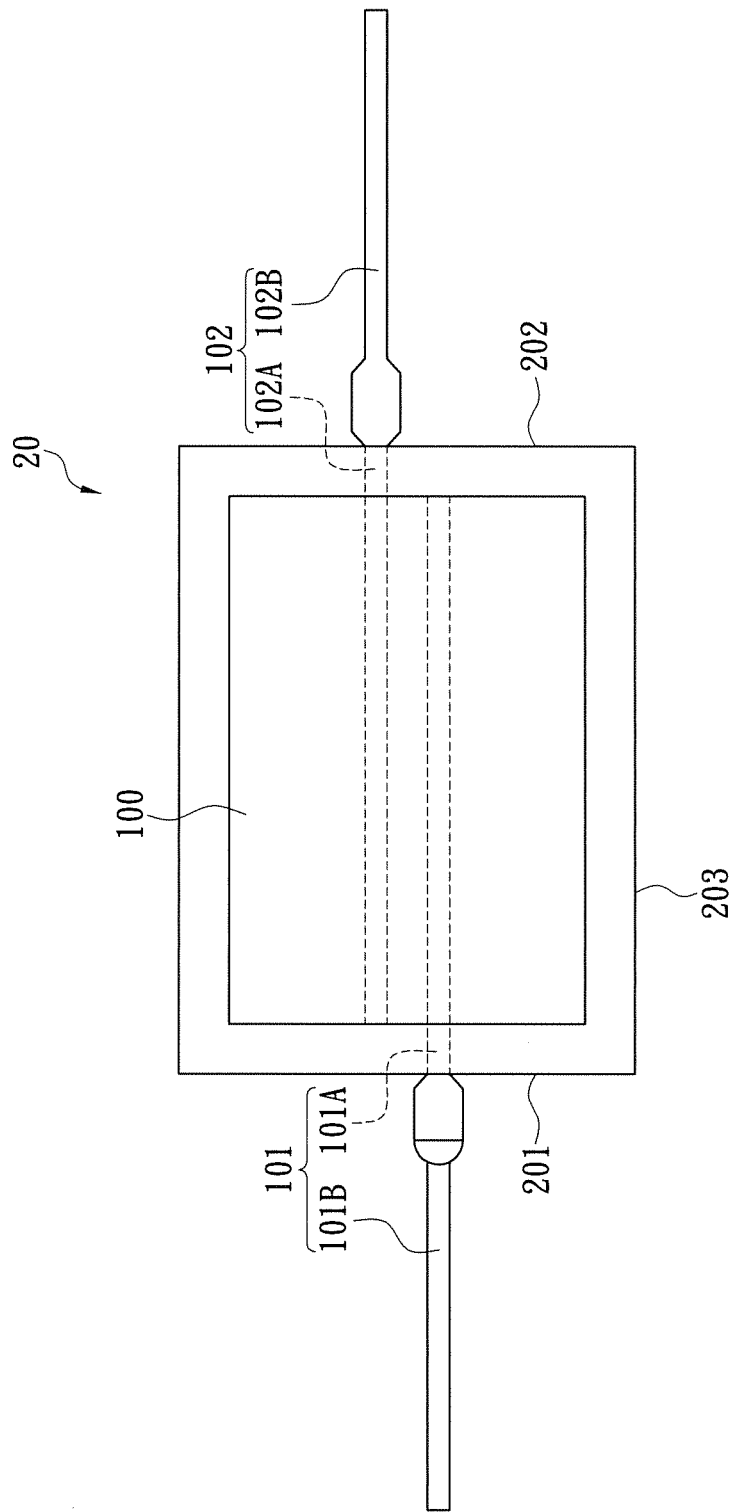
FIG. 5 shows a front, schematic view of the winding body having been enclosed by the package body according to the first embodiment of the instant disclosure.
Figure 6:
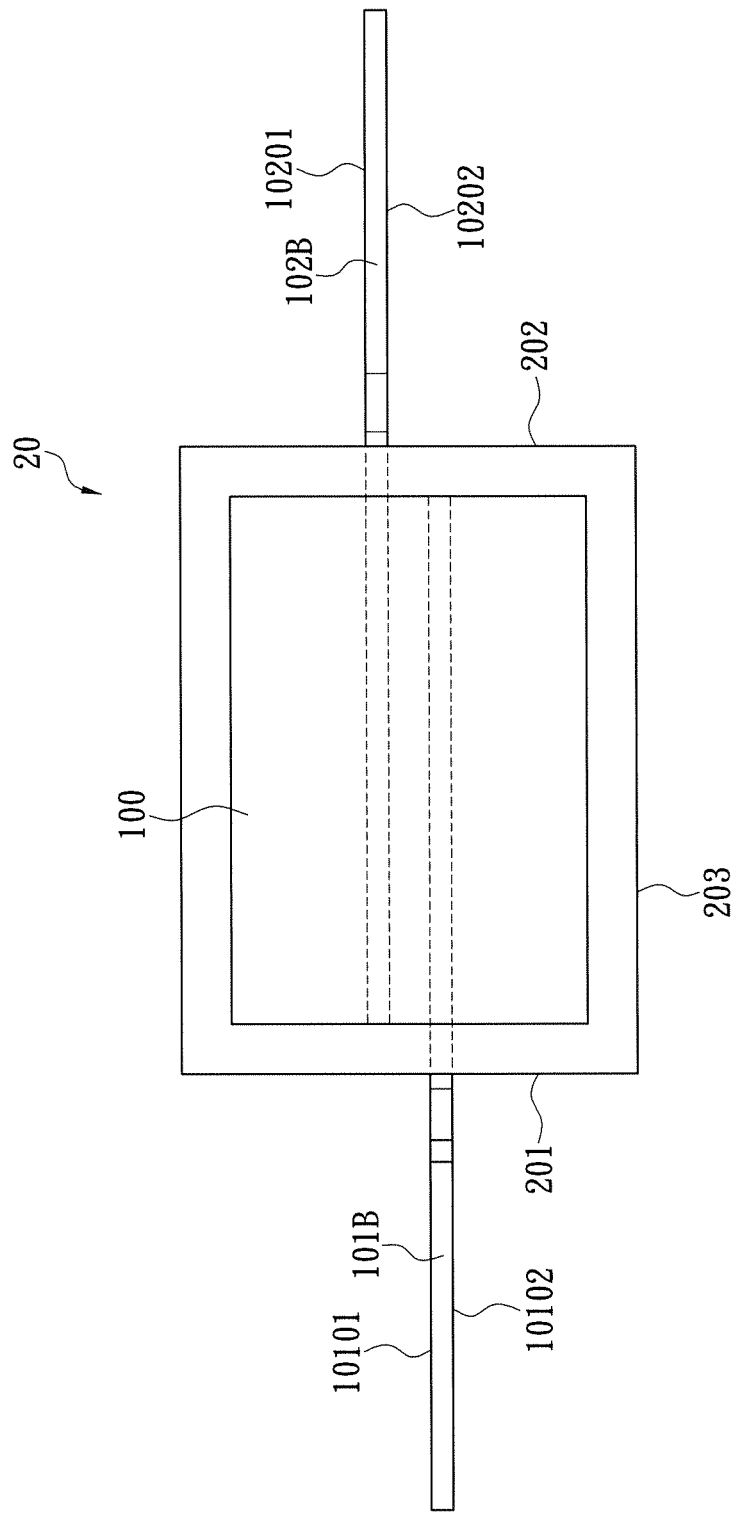
FIG. 6 shows a front, schematic view of both the first exposed portion of the positive conductive lead pin and the second exposed portion of the negative conductive lead pin having been flattened according to the first embodiment of the instant disclosure.
Figure 7:
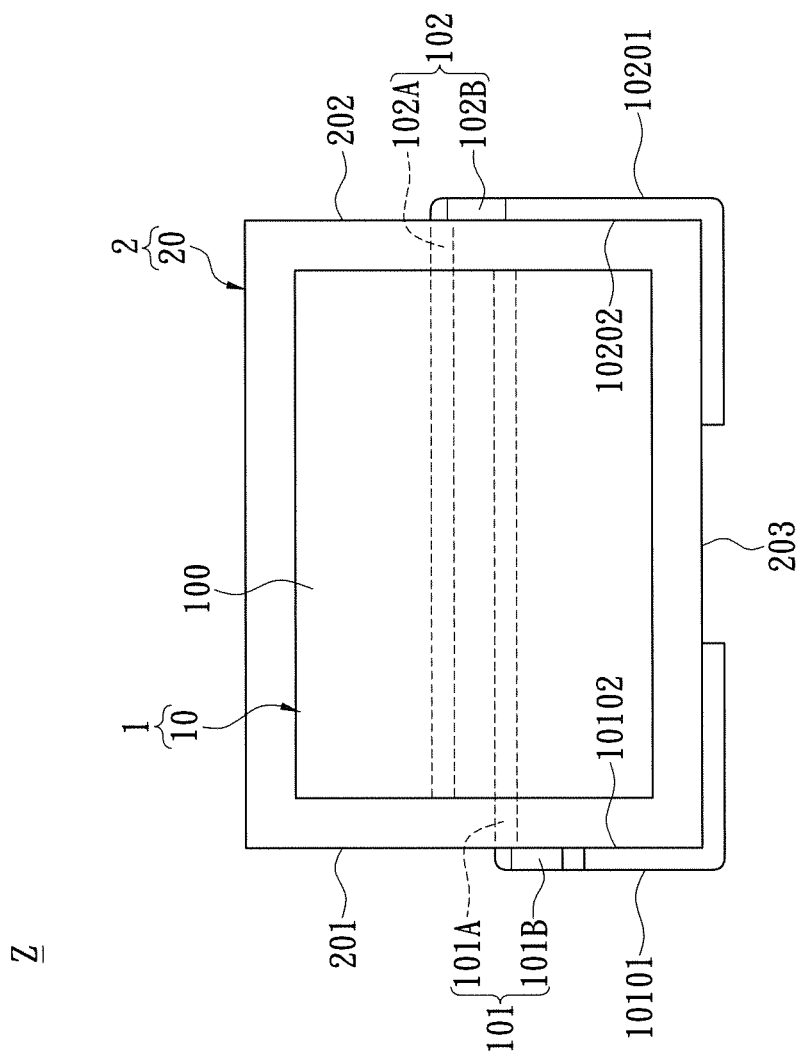
FIG. 7 shows a front, schematic view of both the positive conductive lead pin and the negative conductive lead pin having been bent according to the first embodiment of the instant disclosure.

Referring to FIG. 1 to FIG. 7, where FIG. 1 shows a flowchart of the method of manufacturing a winding-type solid electrolytic capacitor package structure, FIG. 2 shows a front, schematic view of both the first exposed portion and the second exposed portion having not been flattened yet, FIG. 3 shows a perspective, schematic view of the winding body, FIG. 4A shows a cross-sectional view taken along the section line 4A-4A of FIG. 2, FIG. 4B shows a cross-sectional view taken along the section line 4B-4B of FIG. 2, FIG. 5 shows a front, schematic view of the winding body having been enclosed by the package body, FIG. 6 shows a front, schematic view of both the first exposed portion and the second exposed portion having been flattened, and FIG. 7 shows a front, schematic view of both the positive conductive lead pin and the negative conductive lead pin having been bent according to the first embodiment of the instant disclosure. The first embodiment of the instant disclosure provides a method of manufacturing a winding-type solid electrolytic capacitor package structure Z without using any lead frame, comprising the following steps:

First, referring to FIG. 1 and FIG. 2, the step S100 is that: providing at least one winding capacitor 10, wherein the winding capacitor 10 has a winding body 100, a positive conductive lead pin 101 extended from a first lateral side of the winding body 100, and a negative conductive lead pin 102 extended from a second lateral side of the winding body 100, and the first lateral side and the second lateral side are two opposite lateral sides of the winding body 100. In addition, the winding capacitor 10 can be processed by a carbonization process, a formation process and a polymer-impregnated process in sequence in the step S100 of providing the winding capacitor 10.

For example, referring to FIG. 2 and FIG. 3, the winding body 100 has a positive foil sheet 100A, a negative foil sheet 100B and an isolation paper 1000 disposed between the positive foil sheet 100A and the negative foil sheet 100B and the positive foil sheet 100A the negative foil sheet 100B and the isolation paper 100C are concurrently rolled and pressed to form a cuboid capacitor core. In addition, the positive conductive lead pin 101 and the negative conductive lead pin 102 can respectively electrically contact the positive foil sheet 100A and the negative foil sheet 100B. The positive conductive lead pin 101 has a positive end portion (shown as the hidden line in FIG. 2) inserted into the winding body 100 and disposed between the positive foil sheet 100A and the isolation paper 100C, the negative conductive lead pin 102 has a negative end portion (shown as the hidden line in FIG. 2) inserted into the winding body 100 and disposed between the negative foil sheet 100B and the isolation paper 100C, and the length of the positive end portion and the length of the negative end portion are substantially the same as the width of the winding body 100 as shown in FIG. 2. Furthermore, the method of manufacturing the cuboid capacitor core includes: wrapping the positive foil sheet 100A, the negative foil sheet 100B and the isolation paper 100C to form a cylindrical capacitor core (not shown), and then pressing the cylindrical capacitor core at a temperature of about 50° C.~300° C. to form the cuboid capacitor core. In addition, the cuboid capacitor core has a plane top surface 1001 and a plane bottom surface 1002 opposite to the plane top surface 1001 formed by pressing.

For example, the positive conductive lead pin 101 has a first positive conductive portion 1011 electrically contacting the positive foil sheet 100A, a second positive conductive portion 1012, and a first soldering portion 1013 connected between the first positive conductive portion 1011 and the second positive conductive portion 1012, and the negative conductive lead pin 102 can be formed as a one-piece structure without using a precision soldering process, thus there is no any soldering point on the negative conductive lead pin 102 for decreasing the impedance and the length of the conductive lead pin and increasing the current carrying capacity. Furthermore, referring to FIG. 4A and FIG. 4B, the first positive conductive portion 1011 can be made of a pure Al (aluminum) material or an Al alloy material, the second positive conductive portion 1012 may be a first multilayer structure composed of a plurality of first material layers M1, and the negative conductive lead pin 102 may be a second multilayer structure composed of a plurality of second material layers M2. In addition, the innermost first material layer M11 may be a Fe (ferrum) layer or a Cu (copper) layer, and the outermost first material layer M12 may be an Sn (stannum) layer surrounding the Fe layer or the Cu layer. The innermost second material layer M21 may be a pure Al layer or an Al alloy layer, and the outermost second material layer M22 may be an Sn layer formed by chemical plating or electroplating to surround the pure Al layer or the Al alloy layer. More precisely, the pure Al layer or the Al alloy layer of the innermost second material layer M21 can be directly enclosed by the Sn layer of the outermost second material layer M22, or there is a connection layer (such as a Cu layer) is disposed between the innermost second material layer M21 and the outermost second material layer M22. In addition, the electrical conductivity of Al is larger than that of Fe, and the cost of Al is lower than that of Cu, thus the electrical conductivity of the instant disclosure can be increased and the cost of the instant disclosure can be decreased.

Next, referring to FIG. 2 and FIG. 5, the step S102 is that: forming a package body 20 (such as epoxy) to enclose the winding body 100, wherein the positive conductive lead pin 101 has a first embedded portion 101A enclosed by the package body 20 and a first exposed portion 101B connected with the first embedded portion 101A and exposed outside or from the package body 20, and the negative conductive lead pin 102 has a second embedded portion 102A enclosed by the package body 20 and a second exposed portion 102B connected with the second embedded portion 102A and exposed or from outside the package body 20. More precisely, the winding capacitor 10 can be processed by an ageing process after the step of forming the package body 20 to enclose the winding body 100. In addition, the package body 20 has a first lateral surface 201, a second lateral surface 202 opposite to the first lateral surface 201, and a bottom surface 203 connected between the first lateral surface 201 and the second lateral surface 202.

Then, referring to FIG. 5 and FIG. 6, the step S104 is that: flattening or planishing the top side and the bottom side of the first exposed portion 101B and the top side and the bottom side of the second exposed portion 102B. More precisely, the first exposed portion 101B has a first flattening surface 10101 and a second flattening surface 10102 respectively formed on the top side and the bottom side of the first exposed portion 101B, and the second exposed portion 102B has a first flattening surface 10201 and a second flattening surface 10202 respectively formed on the top side and the bottom side of the second exposed portion 102B. Of course, the winding body 100 can be enclosed by the package body 20 in advance after flattening the top side and the bottom side of the first exposed portion 101B and the top side and the bottom side of the second exposed portion 102B.

Finally, referring to FIG. 6 and FIG. 7, the step S106 is that: bent the first exposed portion 101B and the second exposed portion 102B along an outer surface of the package body 20. More precisely, the first exposed portion 101B can be extended along the first lateral surface 201 and the bottom surface 203 of the package body 20, and the second exposed portion 102B can be extended along the second lateral surface 202 and the bottom surface 203 of the package body 20. In addition, the second flattening surface 10102 of the first exposed portion 101B is directed toward (or formed toward) and abutted against the first lateral surface 201 and the bottom surface 203 of the package body 20, and the first flattening surface 10101 of the first exposed portion 101B is opposite to (or formed backward) the first lateral surface 201 and the bottom surface 203 of the package body 20. The second flattening surface 10202 of the second exposed portion 102B is directed toward and abutted against the second lateral surface 202 and the bottom surface 203 of the package body 20, and the first flattening surface 10201 of the second exposed portion 102B is opposite to the second lateral surface 202 and the bottom surface 203 of the package body 20.

Hence, the first embodiment of the instant disclosure can provide a winding-type solid electrolytic capacitor package structure Z without using a lead frame through the step S100 to the step S106, comprising: a capacitor unit 1 and a package unit 2. The capacitor unit 1 includes at least one winding capacitor 10. The winding capacitor 10 has a winding body 100, a positive conductive lead pin 101 extended from a first lateral side of the winding body 100, and a negative conductive lead pin 102 extended from a second lateral side of the winding body 100. The package unit 2 includes a package body 20 for enclosing the winding body 100. The package body 20 has a first lateral surface 201, a second lateral surface 202 opposite to the first lateral surface 201, and a bottom surface 203 connected between the first lateral surface 201 and the second lateral surface 202. Moreover, the positive conductive lead pin 101 has a first embedded portion 101A enclosed by the package body 20 and a first exposed portion 101B connected with the first embedded portion 101A and exposed outside or from the package body 20, and the first exposed portion 101B can be extended along the first lateral surface 201 and the bottom surface 203 of the package body 20. The negative conductive lead pin 102 has a second embedded portion 102A enclosed by the package body 20 and a second exposed portion 102B connected with the second embedded portion 102A and exposed outside and from the package body 20, and the second exposed portion 102B can be extended along the second lateral surface 202 and the bottom surface 203 of the package body 20.

More precisely, the first exposed portion 101B has a first flattening surface 10101 and a second flattening surface 10102 opposite to the first flattening surface 10101, the second flattening surface 10102 of the first exposed portion 101B is directed toward and abutted against the first lateral surface 201 and the bottom surface 203 of the package body 20, and the first flattening surface 10101 of the first exposed portion 101B is opposite to the first lateral surface 201 and the bottom surface 203 of the package body 20. In addition, the second exposed portion 102B has a first flattening surface 10201 and a second flattening surface 10202 opposite to the first flattening surface 10201, the second flattening surface 10202 of the second exposed portion 102B is directed toward and abutted against the second lateral surface 202 and the bottom surface 203 of the package body 20, and the first flattening surface 10201 of the second exposed portion 102B is opposite to the second lateral surface 202 and the bottom surface 203 of the package body 20.

Second Embodiment

Figure 8:
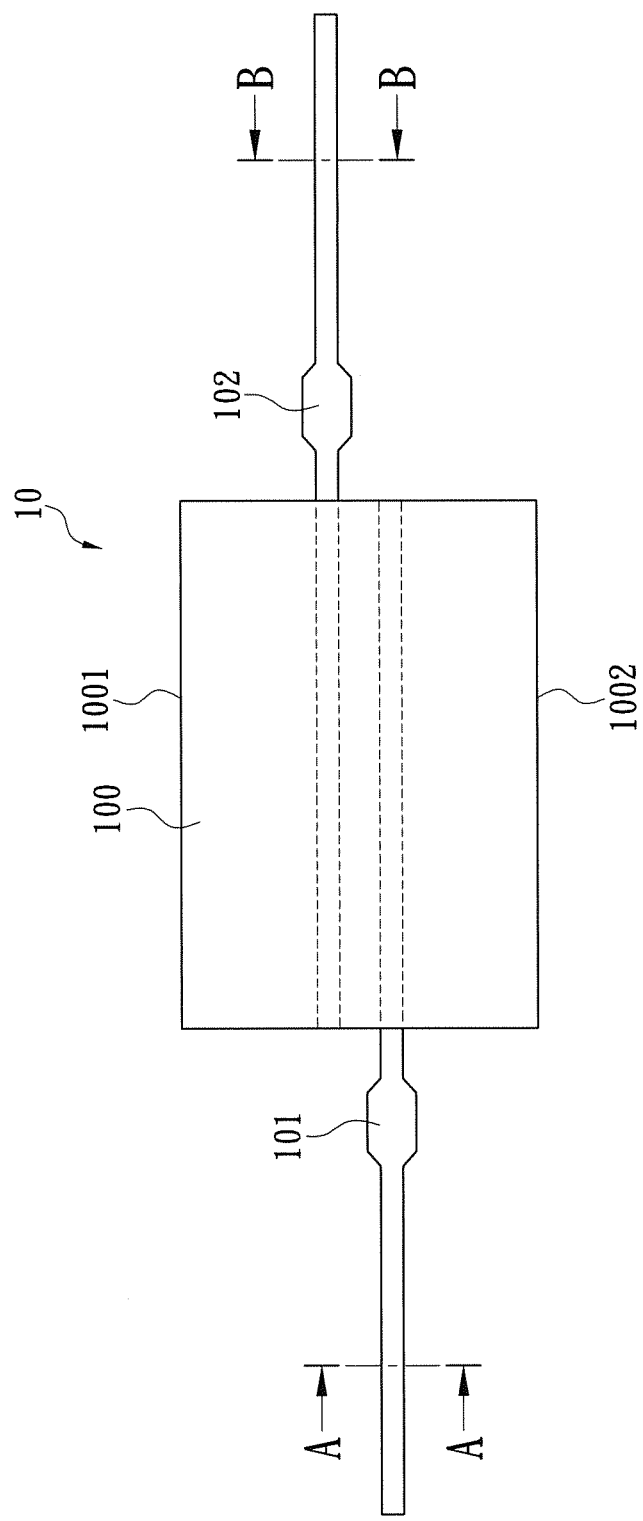
FIG. 8 shows a front, schematic view of both the first exposed portion of the positive conductive lead pin and the second exposed portion of the negative conductive lead pin having not been flattened yet according to the second embodiment of the instant disclosure.
Figure 9:
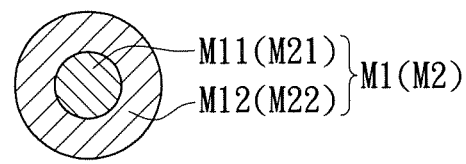
FIG. 9 shows a cross-sectional view taken along the section line A-A and B-B of FIG. 8.
Figure 10:
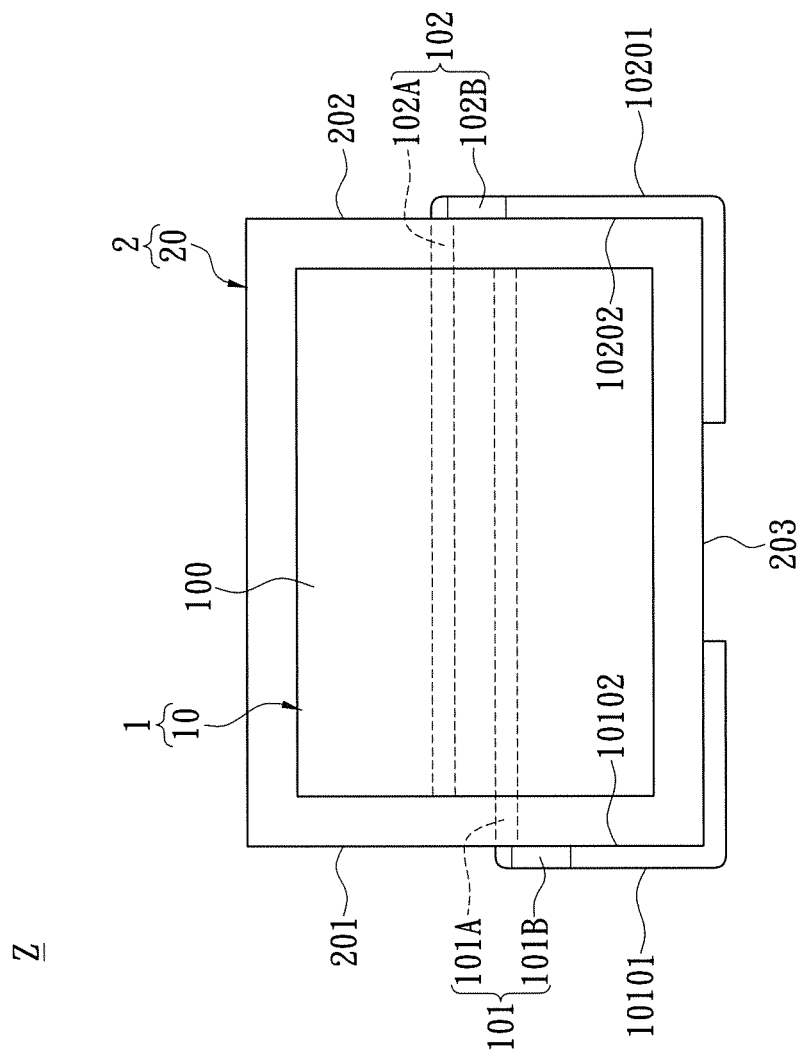
FIG. 10 shows a front, schematic view of both the positive conductive lead pin and the negative conductive lead pin having been bent according to the second embodiment of the instant disclosure.

Referring to FIG. 8 to FIG. 10, where FIG. 9 shows a cross-sectional view taken along the section line A-A and B-B of FIG. 8, and the second embodiment of the instant disclosure provides a winding-type solid electrolytic capacitor package structure Z without using any lead frame comprising: a capacitor unit 1 and a package unit 2. Comparing FIG. 8 with FIG. 2 and comparing FIG. 9 with FIG. 4A and FIG. 4B the difference between the second embodiment and the first embodiment is as follows: in the second embodiment, both the positive conductive lead pin 101 and the negative conductive lead pin 102 can be formed as one-piece structures without using a precision soldering process, thus there is no any soldering point on the positive conductive lead pin 101 and the negative conductive lead pin 102 for decreasing the impedance and the length of the conductive lead pin and increasing the current carrying capacity. In addition, the positive conductive lead pin 101 may be a first multilayer structure composed of a plurality of first material layers M1, and the negative conductive lead pin 102 may be a second multilayer structure composed of a plurality of second material layers M2.

For example, referring to FIG. 8 and FIG. 9, both the innermost first material layer M11 and the innermost second material layer M21 are two pure Al layers or Al alloy layers, and both the outermost first material layer M12 and the outermost second material layer M22 are two Sn layers formed by chemical plating or electroplating to respectively surrounding the two pure Al layers or the two Al alloy layers. More precisely, the pure Al layer or the Al alloy layer of the innermost second material layer M21 can be directly enclosed by the Sn layer of the outermost second material layer M22, or there is a connection layer (such as a Cu layer) is disposed between the innermost second material layer M21 and the outermost second material layer M22. In addition, the electrical conductivity of Al is larger than that of Fe, and the cost of Al is lower than that of Cu, thus the electrical conductivity of the instant disclosure can be increased and the cost of the instant disclosure can be decreased.

Third Embodiment

Figure 11:
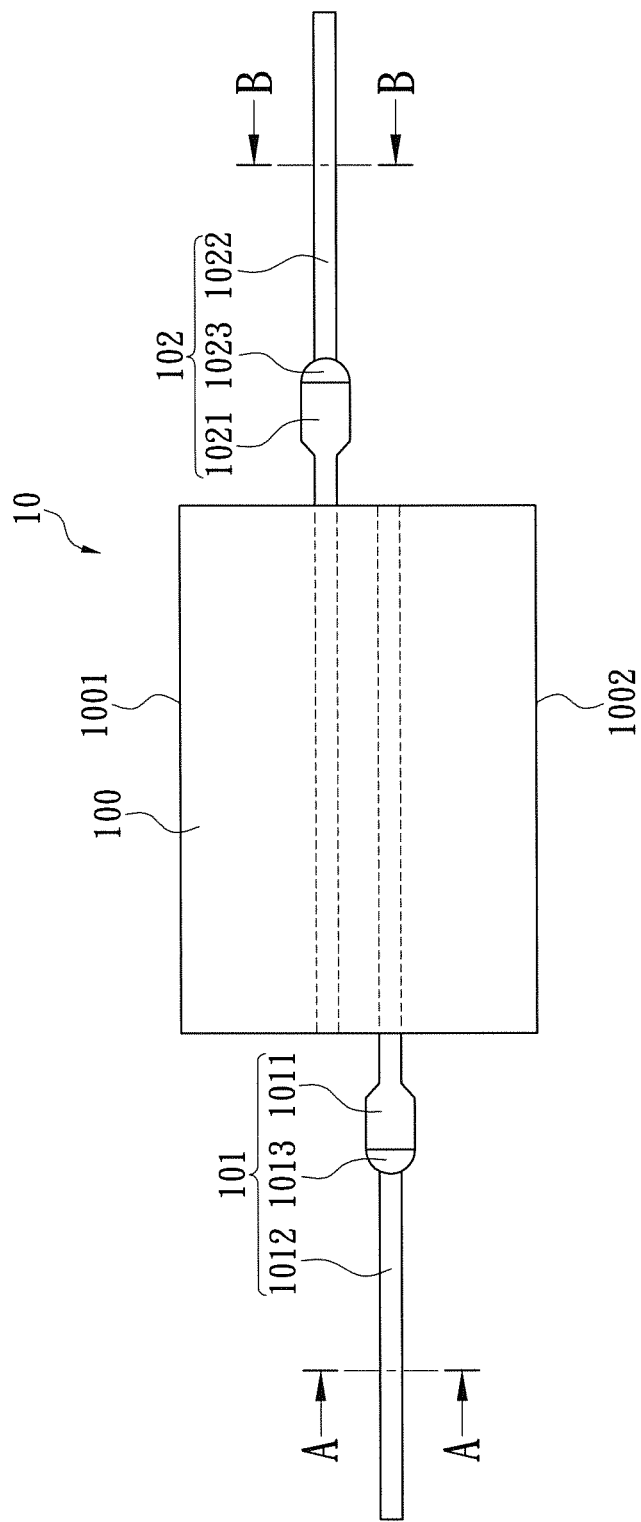
FIG. 11 shows a front, schematic view of both the first exposed portion of the positive conductive lead pin and the second exposed portion of the negative conductive lead pin having not been flattened yet according to the third embodiment of the instant disclosure.
Figure 12:
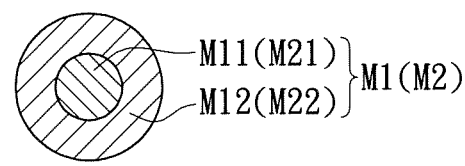
FIG. 12 shows a cross-sectional view taken along the section line A-A and B-B of FIG. 11.
Figure 13:
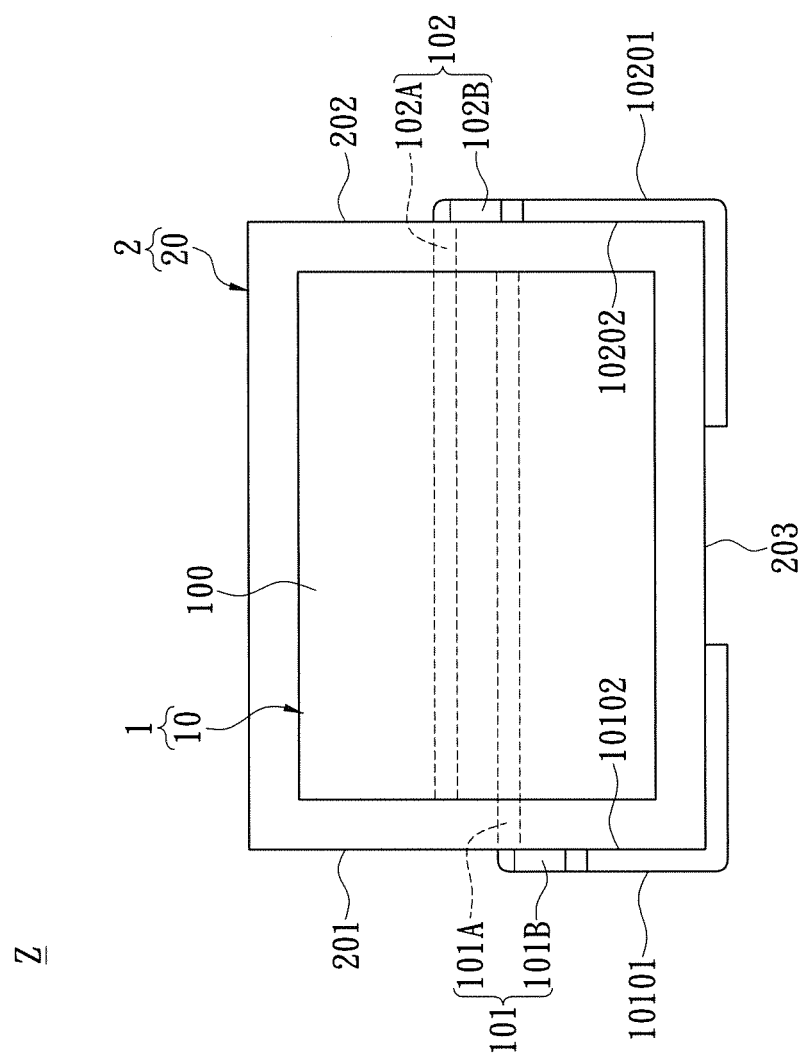
FIG. 13 shows a front, schematic view of both the positive conductive lead pin and the negative conductive lead pin having been bent according to the third embodiment of the instant disclosure.

Referring to FIG. 11 to FIG. 13, where FIG. 12 shows a cross-sectional view taken along the section line A-A and B-B of FIG. 11, and the third embodiment of the instant disclosure provides a winding-type solid electrolytic capacitor package structure Z without using any lead frame comprising: a capacitor unit 1 and a package unit 2. Comparing FIG. 11 with FIG. 8 and comparing FIG. 12 with FIG. 9, the difference between the third embodiment and the second embodiment is as follows: in the third embodiment, the positive conductive lead pin 101 has a first positive conductive portion 1011 electrically contacting the positive foil sheet 100A, a second positive conductive portion 1012, and a first soldering portion 1013 connected between the first positive conductive portion 1011 and the second positive conductive portion 1012. And, the negative conductive lead pin 102 has a first negative conductive portion 1021 electrically contacting the negative foil sheet 100B, a second negative conductive portion 1022, and a second soldering portion 1023 connected between the first negative conductive portion 1021 and the second negative conductive portion 1022.

For example, referring to FIG. 11 and FIG. 12, both the first positive conductive portion 1011 and the first negative conductive portion 1021 can be made of a pure Al material or an Al alloy material, the second positive conductive portion 1012 may be a first multilayer structure composed of a plurality of first material layers M1, and the second negative conductive portion 1022 may be a second multilayer structure composed of a plurality of second material layers M2. In addition, both the innermost first material layer M11 and the inner most second material layer M21 are two Fe layers or two Cu layers, and both the outermost first material layer M12 and the outermost second material layer M22 are two Sn layers respectively surrounding the two Fe layers or the two Cu layers.

In conclusion, the winding capacitor 10 has a winding body 100, a positive conductive lead pin 101 and a negative conductive lead pin 102, the positive conductive lead pin 101 has a first embedded portion 101A enclosed by the package body 20 and a first exposed portion 101B exposed outside the package body 20 and extended along the outer surface of the package body 20, and the negative conductive lead pin 102 has a second embedded portion 102A enclosed by the package body 20 and a second exposed portion 102B exposed outside the package body 20 and extended along the outer surface of the package body 20, thus the winding-type solid electrolytic capacitor package structure Z of the instant disclosure can be manufactured without using any lead frame for decreasing the manufacturing cost and increasing the manufacturing speed (i.e., the production quantity) and the production yield rate.

The above-mentioned descriptions merely represent the preferred embodiments of the instant disclosure, without any intention or ability to limit the scope of the instant disclosure which is fully described only within the following claims.

Various equivalent changes, alterations or modifications based on the claims of instant disclosure are all, consequently, viewed as being embraced by the scope of the instant disclosure.

What is claimed is:

1. A winding-type solid electrolytic capacitor package structure without using a lead frame, comprising:
   a capacitor unit including at least one winding capacitor, wherein the at least one winding capacitor has a winding body, a positive conductive lead pin extended from a first lateral side of the winding body, and a negative conductive lead pin extended from a second lateral side of the winding body; and
   a package unit including a package body for enclosing the winding body, wherein the package body has a first lateral surface, a second lateral surface opposite to the first lateral surface, and a bottom surface connected between the first lateral surface and the second lateral surface;
   wherein the positive conductive lead pin has a first embedded portion enclosed by the package body and a first exposed portion connected with the first embedded portion and exposed outside the package body, and the first exposed portion is extended along the first lateral surface and the bottom surface of the package body;
   wherein the negative conductive lead pin has a second embedded portion enclosed by the package body and a second exposed portion connected with the second embedded portion and exposed outside the package body, and the second exposed portion is extended along the second lateral surface and the bottom surface of the package body;
   wherein the positive conductive lead pin has a first positive conductive portion, a second positive conductive portion, and a first soldering portion connected between the first positive conductive portion and the second positive conductive portion, the second positive conductive portion is a first multilayer structure composed of a plurality of first material layers, and the negative conductive lead pin is a second multilayer structure composed of a plurality of second material layers.

2. The winding-type solid electrolytic capacitor package structure of claim 1, wherein the first exposed portion has a first flattening surface and a second flattening surface, the second flattening surface of the first exposed portion is directed toward the first lateral surface and the bottom surface of the package body, and the first flattening surface of the first exposed portion is opposite to the first lateral surface and the bottom surface of the package body, wherein the second exposed portion has a first flattening surface and a second flattening surface, the second flattening surface of the second exposed portion is directed toward the second lateral surface and the bottom surface of the package body, and the first flattening surface of the second exposed portion is opposite to the second lateral surface and the bottom surface of the package body.

3. The winding-type solid electrolytic capacitor package structure of claim 1, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

4. The winding-type solid electrolytic capacitor package structure of claim 3, wherein the first positive conductive portion electrically contacts the positive foil sheet, the first positive conductive portion is made of a pure Al material or an Al alloy material, wherein the innermost first material layer is a Fe layer or a Cu layer, the outermost first material layer is an Sn layer surrounding the Fe layer or the Cu layer, the innermost second material layer is a pure Al layer or an Al alloy layer, and the outermost second material layer is an Sn layer surrounding the pure Al layer or the Al alloy layer.

5. A winding-type solid electrolytic capacitor package structure without using a lead frame, comprising:
   a capacitor unit including at least one winding capacitor, wherein the at least one winding capacitor has a winding body, a positive conductive lead pin extended from a first lateral side of the winding body, and a negative conductive lead pin extended from a second lateral side of the winding body; and
   a package unit including a package body for enclosing the winding body, wherein the package body has a first lateral surface, a second lateral surface opposite to the first lateral surface, and a bottom surface connected between the first lateral surface and the second lateral surface;
   wherein the positive conductive lead pin has a first embedded portion enclosed by the package body and a first exposed portion connected with the first embedded portion and exposed outside the package body, and the first exposed portion is extended along the first lateral surface and the bottom surface of the package body;
   wherein the negative conductive lead pin has a second embedded portion enclosed by the package body and a second exposed portion connected with the second embedded portion and exposed outside the package body, and the second exposed portion is extended along the second lateral surface and the bottom surface of the package body;
   wherein the positive conductive lead pin is a first multilayer structure composed of a plurality of first material layers, the negative conductive lead pin is a second multilayer structure composed of a plurality of second material layers.

6. The winding-type solid electrolytic capacitor package structure of claim 5, wherein the first exposed portion has a first flattening surface and a second flattening surface, the second flattening surface of the first exposed portion is directed toward the first lateral surface and the bottom surface of the package body, and the first flattening surface of the first exposed portion is opposite to the first lateral surface and the bottom surface of the package body, wherein the second exposed portion has a first flattening surface and a second flattening surface, the second flattening surface of the second exposed portion is directed toward the second lateral surface and the bottom surface of the package body, and the first flattening surface of the second exposed portion is opposite to the second lateral surface and the bottom surface of the package body.

7. The winding-type solid electrolytic capacitor package structure of claim 5, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

8. The winding-type solid electrolytic capacitor package structure of claim 5, wherein both the innermost first material layer and the innermost second material layer are two pure Al layers or Al alloy layers, and both the outermost first material layer and the outermost second material layer are two Sn layers respectively surrounding the two pure Al layers or the two Al alloy layers.

9. A winding-type solid electrolytic capacitor package structure without using a lead frame, comprising:
   a capacitor unit including at least one winding capacitor, wherein the at least one winding capacitor has a winding body, a positive conductive lead pin extended from a first lateral side of the winding body, and a negative conductive lead pin extended from a second lateral side of the winding body; and
   a package unit including a package body for enclosing the winding body, wherein the package body has a first lateral surface, a second lateral surface opposite to the first lateral surface, and a bottom surface connected between the first lateral surface and the second lateral surface;
   wherein the positive conductive lead pin has a first embedded portion enclosed by the package body and a first exposed portion connected with the first embedded portion and exposed outside the package body, and the first exposed portion is extended along the first lateral surface and the bottom surface of the package body;
   wherein the negative conductive lead pin has a second embedded portion enclosed by the package body and a second exposed portion connected with the second embedded portion and exposed outside the package body, and the second exposed portion is extended along the second lateral surface and the bottom surface of the package body;
   wherein the positive conductive lead pin has a first positive conductive portion, a second positive conductive portion, and a first soldering portion connected between the first positive conductive portion and the second positive conductive portion, the negative conductive lead pin has a first negative conductive portion, a second negative conductive portion, and a second soldering portion connected between the first negative conductive portion and the second negative conductive portion, the second positive conductive portion is a first multilayer structure composed of a plurality of first material layers, and the second negative conductive portion is a second multilayer structure composed of a plurality of second material layers.

10. The winding-type solid electrolytic capacitor package structure of claim 9, wherein the first exposed portion has a first flattening surface and a second flattening surface, the second flattening surface of the first exposed portion is directed toward the first lateral surface and the bottom surface of the package body, and the first flattening surface of the first exposed portion is opposite to the first lateral surface and the bottom surface of the package body, wherein the second exposed portion has a first flattening surface and a second flattening surface, the second flattening surface of the second exposed portion is directed toward the second lateral surface and the bottom surface of the package body, and the first flattening surface of the second exposed portion is opposite to the second lateral surface and the bottom surface of the package body.

11. The winding-type solid electrolytic capacitor package structure of claim 9, wherein the winding body has a positive foil sheet, a negative foil sheet and an isolation paper disposed between the positive foil sheet and the negative foil sheet, the positive foil sheet, the negative foil sheet and the isolation paper are rolled to form a cuboid capacitor core, and the positive conductive lead pin and the negative conductive lead pin respectively electrically contact the positive foil sheet and the negative foil sheet.

12. The winding-type solid electrolytic capacitor package structure of claim 11, wherein the first positive conductive portion electrically contacts the positive foil sheet, the first negative conductive portion electrically contacts the negative foil sheet, both the first positive conductive portion and the first negative conductive portion are made of a pure Al material or an Al alloy material, wherein both the innermost first material layer and the inner most second material layer are two Fe layers or two Cu layers, and both the outermost first material layer and the outermost second material layer are two Sn layers respectively surrounding the two Fe layers or the two Cu layers.

* * * * *